United States Patent
Kamijo

(10) Patent No.: US 6,996,445 B1
(45) Date of Patent: Feb. 7, 2006

(54) SOUND VOLUME ADJUSTMENT SYSTEM IN PERSONAL COMPUTER AND SOUND VOLUME ADJUSTMENT METHOD THEREOF

(75) Inventor: Fumiaki Kamijo, Tokyo (JP)

(73) Assignee: NEC Corporation, Tokyo (JP)

( * ) Notice: Subject to any disclaimer, the term of this patent is extended or adjusted under 35 U.S.C. 154(b) by 318 days.

(21) Appl. No.: 09/625,510

(22) Filed: Jul. 25, 2000

(30) Foreign Application Priority Data

Jul. 27, 1999 (JP) ................................. 11-212325

(51) Int. Cl.
*G06F 17/00* (2006.01)
*H03G 3/00* (2006.01)

(52) U.S. Cl. .................. 700/94; 381/107; 381/104
(58) Field of Classification Search ........ 381/104–107, 381/101; 700/94; 84/633, 665; 345/719, 345/722, 727, 716 T
See application file for complete search history.

(56) References Cited

U.S. PATENT DOCUMENTS

| | | | | |
|---|---|---|---|---|
| 4,292,467 A | * | 9/1981 | Odlen et al. .............. 333/28 T |
| 5,289,546 A | * | 2/1994 | Hetherington .............. 381/104 |
| 5,487,102 A | * | 1/1996 | Rothschild et al. ........ 379/67.1 |
| 5,530,924 A | * | 6/1996 | Miller ......................... 381/101 |
| 6,009,181 A | * | 12/1999 | Kim ............................ 381/109 |
| 6,016,136 A | * | 1/2000 | Fado et al. ................. 345/721 |
| 6,122,701 A | * | 9/2000 | Kunkel ....................... 381/104 |
| 6,195,438 B1 | * | 2/2001 | Yumoto et al. ............. 381/107 |
| 6,405,092 B1 | * | 6/2002 | Oxford ........................ 377/69 |

FOREIGN PATENT DOCUMENTS

| | | |
|---|---|---|
| JP | 4-251325 | 9/1992 |
| JP | 5-19729 | 1/1993 |
| JP | 6-110642 | 4/1994 |
| JP | 8-163527 | 6/1996 |
| JP | 9-190166 | 7/1997 |
| JP | 10-31578 | 3/1998 |

* cited by examiner

*Primary Examiner*—Laura A. Grier
(74) *Attorney, Agent, or Firm*—Foley & Lardner LLP

(57) ABSTRACT

The sound volume adjustment system for a personal computer includes a memory in which sound volume setting information set for each application is registered, and a sound volume adjustment control unit for adjusting, for each application, sound volume data transferred from the application to an operating system based on the sound volume setting information to generate adjusted sound volume data and transferring the adjusted sound volume data to the operating system.

9 Claims, 3 Drawing Sheets

SOUND VOLUME ADJUSTMENT SYSTEM IN PERSONAL COMPUTER AND SOUND VOLUME ADJUSTMENT METHOD THEREOF

BACKGROUND OF THE INVENTION

1. Field of the Invention

The present invention relates to a sound volume adjustment system in a personal computer and, more particularly, to a sound volume adjustment system enabling voice data to be reproduced in a level sound volume appropriate for each application and a sound volume adjustment method thereof.

2. Description of the Related Art

First, one example of sound volume adjustment in a conventional personal computer will be described with reference to FIG. 3.

FIG. 3 is a functional block diagram for use in explaining an arrangement of sound volume adjustment in a conventional personal computer. In multi-task environments, for example, voice data is transferred from a plurality of applications 320 and 321 to an operating system (e.g. Windows 98 (Registered Trademark)) as illustrated in FIG. 3. Then, an operating system 300 reproduces the voice data by the sound function. A sound volume of the reproduced sound is adjusted by a volume adjustment function 310.

The sound function of a personal computer has not only a function of reproducing voice data from an application but also a function of generating a warning sound for use in notifying the occurrence of error etc. by an operating system.

In a conventional personal computer, however, a sound volume of a reproduced sound of voice data and a sound volume of a warning sound are adjusted in the lump by the common volume adjustment function (e.g. analog volume) 310. Change of the volume of the reproduced sound of voice data will therefore result in change of the sound volume of the warning sound as well.

As a result, in a conventional personal computer, when an error occurs while voice data from an application is reproduced with its sound volume increased, a large volume of warning sound will be generated. To the contrary, when an error occurs while voice data is reproduced with its volume decreased, a user might not notice the warning sound.

Under these circumstances, a technique of individually adjusting a sound volume of a warning sound (buzzer sound) and a volume of a reproduced sound of voice data is proposed in Japanese Patent Laid-Open Kokai No. (Heisei) 10-31578 (Literature 1). According to the art disclosed in Literature 1, separately provided in addition to an analog volume are a sound volume adjustment unit for adjusting a volume of a reproduced sound of voice data and a buzzer sound volume adjustment unit for adjusting a volume of a warning sound.

The above-described technique disclosed in Literature 1 has an advantage in realizing individual adjustment of a volume of a reproduced sound of voice data and a volume of a warning sound.

The conventional art, however, needs adjustment of the sound volume adjustment unit and the buzzer sound volume adjustment unit in addition to an analog volume, so that operation for sound volume adjustment might be complicated, which leaves a room for technical improvement.

In a multi-task environment, for example, voice data is transferred from a plurality of applications to an operating system as described above. These voice data are ordinarily transferred as pulse coded modulation (PCM) data. For such PCM data, a volume of its reproduced sound is roughly classified into two.

That is, the first reproduced sound volume is a sound volume adjusted for a player as a domestic appliance. Among examples of volumes to be thus adjusted are a sound volume of reproduced voice data of a CD (Compact Disk) and a sound volume of reproduced voice data of a DVD (Digital Video Disk).

Second reproduced sound volume is that of voice data assumed to be handled as an application of a personal computer. Sound volume in this case is adjusted to have the same level as that of a volume of a warning sound of the personal computer.

Thus, even in a case where volumes of reproduced sounds of voice data from applications are adjusted in the lump independently of a volume of a warning sound, the volumes of the reproduced sounds might vary with applications, so that there might arise a need of adjusting a sound volume for each application.

SUMMARY OF THE INVENTION

The present invention, intended to solve the above problems, aims at providing a personal computer enabling voice data to be reproduced in a level sound volume appropriate for each application and requiring easy sound volume adjustment operation and a sound volume adjustment method thereof, and a recording medium which records a program for making the computer to execute the sound volume adjustment processing therefor.

According to the first aspect of the invention, a sound volume adjustment system for a personal computer, comprises a memory in which sound volume setting information set for each application is registered, and sound volume adjustment control means for adjusting, for each application, sound volume data of voice data transferred from the application to an operating system based on the sound volume setting information to generate sound volume data having been adjusted and transferring the sound volume data having been adjusted to the operating system.

Thus registering an application and sound volume setting information correlated to each other and automatically adjusting sound volume data based on the sound volume setting information eliminates the user's need of adjusting a sound volume for each application. The present invention therefore realizes a personal computer enabling voice data to be reproduced in a level sound volume appropriate for each application and requiring easy sound volume adjustment operation.

In the preferred construction, in the memory a sound volume adjustment coefficient is stored as the sound volume setting information, and the sound volume adjustment control means multiplies the sound volume data by the sound volume adjustment coefficient to generate the sound volume data having been adjusted.

Thus, by generating sound volume data having been adjusted by multiplying sound volume data by a sound volume adjustment coefficient, a sound volume can be adjusted with ease.

In another preferred construction, a sound volume level of the sound volume data having been adjusted is set to be equivalent to that of a sound volume of a system sound (error sound) generated by the operating system.

As described in the foregoing, adjusting the level of a sound volume of sound volume data having been adjusted to the level of a sound volume of an error sound allows a sound volume of a reproduced sound of voice data from an application to equal a sound volume of a warning sound. As a result, it is possible to prevent such a situation that a warning sound is too loud or too weak for a volume of a reproduced sound of voice data.

In another preferred construction, in the memory a sound volume adjustment coefficient is stored as the sound volume setting information, the sound volume adjustment control means multiplies the sound volume data by the sound volume adjustment coefficient to generate the sound volume data having been adjusted, and a sound volume level of the sound volume data having been adjusted is set to be equivalent to that of a sound volume of a system sound (error sound) generated by the operating system.

In another preferred construction, when voice data is transferred from an application for which sound volume setting information is yet to be registered, the sound volume adjustment control means displays sound volume adjustment function indications on an operation screen to register, in the memory, sound volume setting information based on a sound volume set by the operation through the sound volume adjustment function indications so as to correspond to the application.

By a manner as described in the foregoing, even with respect to voice data from an application yet to be registered in a memory, it is possible to appropriately adjust a sound volume, as well as registering sound volume setting information thereof. As a result, when voice data is transferred from the application again, a sound volume can be automatically adjusted based on the registered sound volume setting information.

In another preferred construction, in the memory a sound volume adjustment coefficient is stored as the sound volume setting information, the sound volume adjustment control means multiplies the sound volume data by the sound volume adjustment coefficient to generate the sound volume data having been adjusted, and when voice data is transferred from an application for which sound volume setting information is yet to be registered, the sound volume adjustment control means displays sound volume adjustment function indications on an operation screen to register, in the memory, sound volume setting information based on a sound volume set by the operation through the sound volume adjustment function indications so as to correspond to the application.

In another preferred construction, a sound volume level of the sound volume data having been adjusted is set to be equivalent to that of a sound volume of a system sound (error sound) generated by the operating system, and when voice data is transferred from an application for which sound volume setting information is yet to be registered, the sound volume adjustment control means displays sound volume adjustment function indications on an operation screen to register, in the memory, sound volume setting information based on a sound volume set by the operation through the sound volume adjustment function indications so as to correspond to the application.

In another preferred construction, in the memory a sound volume adjustment coefficient is stored as the sound volume setting information, the sound volume adjustment control means multiplies the sound volume data by the sound volume adjustment coefficient to generate the sound volume data having been adjusted, a sound volume level of the sound volume data having been adjusted is set to be equivalent to that of a sound volume of a system sound (error sound) generated by the operating system, when voice data is transferred from an application for which sound volume setting information is yet to be registered, the sound volume adjustment control means displays sound volume adjustment function indications on an operation screen to register, in the memory, sound volume setting information based on a sound volume set by the operation through the sound volume adjustment function indications so as to correspond to the application.

According to the second aspect of the invention, a sound volume adjustment method for a personal computer, comprising the steps of
  registering sound volume setting information set for each application,
  adjusting, for each application, sound volume data of voice data transferred from the application to an operating system based on the sound volume setting information to generate sound volume data having been adjusted, and
  transferring the sound volume data having been adjusted to the operating system.

In the preferred construction, a sound volume adjustment coefficient is registered as the sound volume setting information, and the sound volume data is multiplied by the sound volume adjustment coefficient to generate the sound volume data having been adjusted.

In another preferred construction, a sound volume level of the sound volume data having been adjusted is set to be equivalent to that of a sound volume of a system sound (error sound) generated by the operating system.

In another preferred construction, a sound volume adjustment coefficient is stored as the sound volume setting information, the sound volume data is multiplied by the sound volume adjustment coefficient to generate the sound volume data having been adjusted, and a sound volume level of the sound volume data having been adjusted is set to be equivalent to that of a sound volume of a system sound (error sound) generated by the operating system.

In another preferred construction, when voice data is transferred from an application for which sound volume setting information is yet to be registered, sound volume setting information based on a set sound volume is registered in the memory so as to correspond to the application.

In another preferred construction, a sound volume adjustment coefficient is stored as the sound volume setting information, the sound volume data is multiplied by the sound volume adjustment coefficient to generate the sound volume data having been adjusted, and when voice data is transferred from an application for which sound volume setting information is yet to be registered, sound volume setting information based on a set sound volume is registered in the memory so as to correspond to the application.

In another preferred construction, a sound volume level of the sound volume data having been adjusted is set to be equivalent to that of a sound volume of a system sound (error sound) generated by the operating system, and when voice data is transferred from an application for which sound volume setting information is yet to be registered, sound volume setting information based on a set sound volume is registered in the memory so as to correspond to the application.

In another preferred construction, a sound volume adjustment coefficient is stored as the sound volume setting information, the sound volume data is multiplied by the sound volume adjustment coefficient to generate the sound volume data having been adjusted, a sound volume level of the sound volume data having been adjusted is set to be equivalent to that of a sound volume of a system sound (error sound) generated by the operating system, and when voice data is transferred from an application for which sound volume setting information is yet to be registered, sound volume setting information based on a set sound volume is registered in the memory so as to correspond to the application.

According to another aspect of the invention, a computer readable memory storing a sound volume adjustment program for controlling a personal computer to conduct sound volume adjustment, the sound volume adjustment program comprising the steps of registering sound volume setting information set for each application, adjusting, for each application, sound volume data of voice data transferred from the application to an operating system based on the sound volume setting information to generate sound volume data having been adjusted, and transferring the sound volume data having been adjusted to the operating system.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not necessarily obscure the present invention.

It is assumed that the following personal computer sound volume adjustment processing according to the present embodiment is executed by a computer controlled by a program. The program is presented, for example, by a recording medium. Used as the recording medium may be, for example, a magnetic disk, a semiconductor memory or other arbitrary medium which can be read by a computer.

First with reference to FIG. 1, sound volume adjustment in a personal computer according to the present embodiment will be described. In the figure, illustration is made only of a part of the structure related to sound volume adjustment of the personal computer and that of the remaining part is omitted for the sake of explanation.

Figure 1:
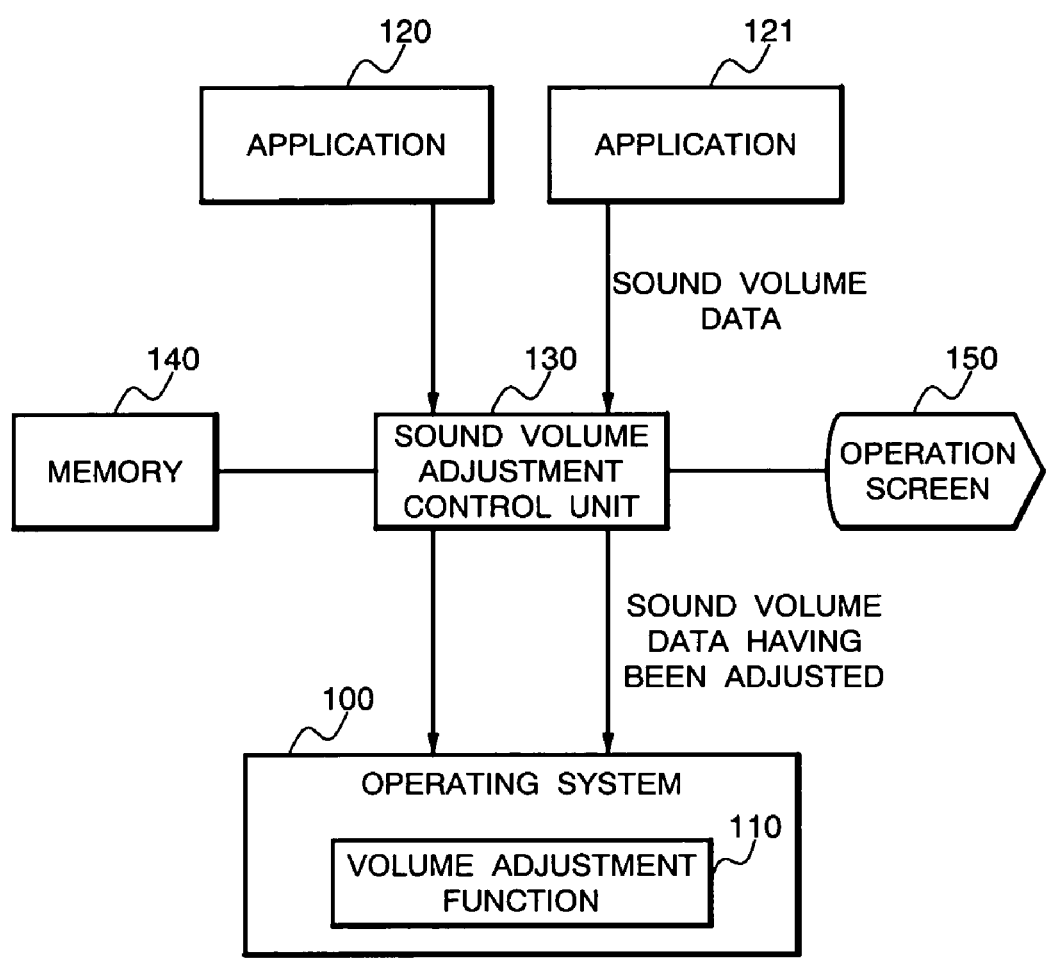
FIG. 1 is a functional block diagram for use in explaining a structure of a personal computer according to one embodiment of the present invention.

FIG. 1 is a functional block diagram for use in explaining the structure related to sound volume adjustment of the personal computer according to the present embodiment. In the present embodiment, as well as the conventional art, voice data is transferred from each of a plurality of applications 120 and 121 to an operating system 100.

Also in the present embodiment similarly to the conventional art, the operating system 100 is provided with a volume adjustment function 110. The volume adjustment function 110 is realized, for example, as an analog volume.

Then, in the present embodiment, sound volume setting information set in advance for each application is registered in a memory 140. Here, a sound volume adjustment coefficient is stored as the sound volume setting information. The sound volume setting information is set such that a sound volume level of sound volume data having been adjusted is equivalent (e.g. the level is set to "1") to that of an error sound or the like generated by the operating system.

In a case, for example, of an application premised on that voice data is handled as an application of the personal computer, its sound volume data is originally set to have the same level of a sound volume as that of a warning sound of the personal computer. Therefore, stored as a sound volume adjustment coefficient corresponding to such an application is "1" indicating that the level is the same as the sound volume level of the warning sound of the personal computer.

Also in a case, for example, where the application is a CD or a DVD, its sound volume data has its sound volume adjusted for a player as a domestic appliance. It is therefore necessary to adjust a volume of a sound which is reproduced based on voice data having been adjusted by multiplying a sound volume level of sound volume data by a predetermined sound volume adjustment coefficient.

In such a case, if a sound volume of the sound volume data is originally set to be smaller than that of the warning sound, the sound volume coefficient may be set to have a value larger than "1" in order to increase a volume of a sound reproduced based on the sound volume data having been adjusted up to a level equivalent to that of the warning sound.

On the other hand, when the sound volume of the sound volume data is originally set to be larger than that of the warning sound, the sound volume coefficient may be set to have a value smaller than "1" in order to decrease the reproduced sound volume based on the sound volume data having been adjusted down to a level equivalent to that of the warning sound.

Then, the personal computer of the present embodiment is provided with a sound volume adjustment control unit 130. The sound volume adjustment control unit 130 adjusts, for each application, sound volume data of voice data transferred from the applications 120 and 121 to the operating system 100 based on the sound volume setting information stored in the memory 140 to generate sound volume data having been adjusted.

Here, the sound volume adjustment control unit 130, at the generation of sound volume data having been adjusted, reads a sound volume adjustment coefficient corresponding to the application from among the sound volume setting information stored in the memory 140. Then, the unit 130 multiplies the sound volume data in the application by the sound volume adjustment coefficient to generate sound volume data having been adjusted.

Then, the sound volume adjustment control unit 130 transfers the sound volume data having been adjusted to the operating system. Therefore, a reproduced sound volume of the voice data is leveled approximately to that of the warning sound irrespective of an application. As a result, a user is allowed to reproduce voice data in a desired sound volume irrespective of an application only by adjusting a sound volume by means of the volume adjustment function 110. The user accordingly needs no adjustment of a sound volume for each application.

The foregoing arrangement enables the present embodiment to reproduce voice data in a level sound volume appropriate for each application and realize a personal computer whose sound volume adjustment is easy.

The sound volume adjustment control unit 130 displays sound volume adjustment function indications on an operation screen 150. When the application is yet to be registered, the sound volume adjustment control unit 130 displays the sound volume adjustment function indication on the operation screen 150. Then, through the user's operation of the sound volume adjustment function indication, sound volume setting information corresponding to a new application, that is, a sound volume adjustment coefficient, is set at the memory 140.

Next, with reference to FIG. 2, description will be made of a personal computer sound volume adjustment method of the present embodiment.

Figure 2:
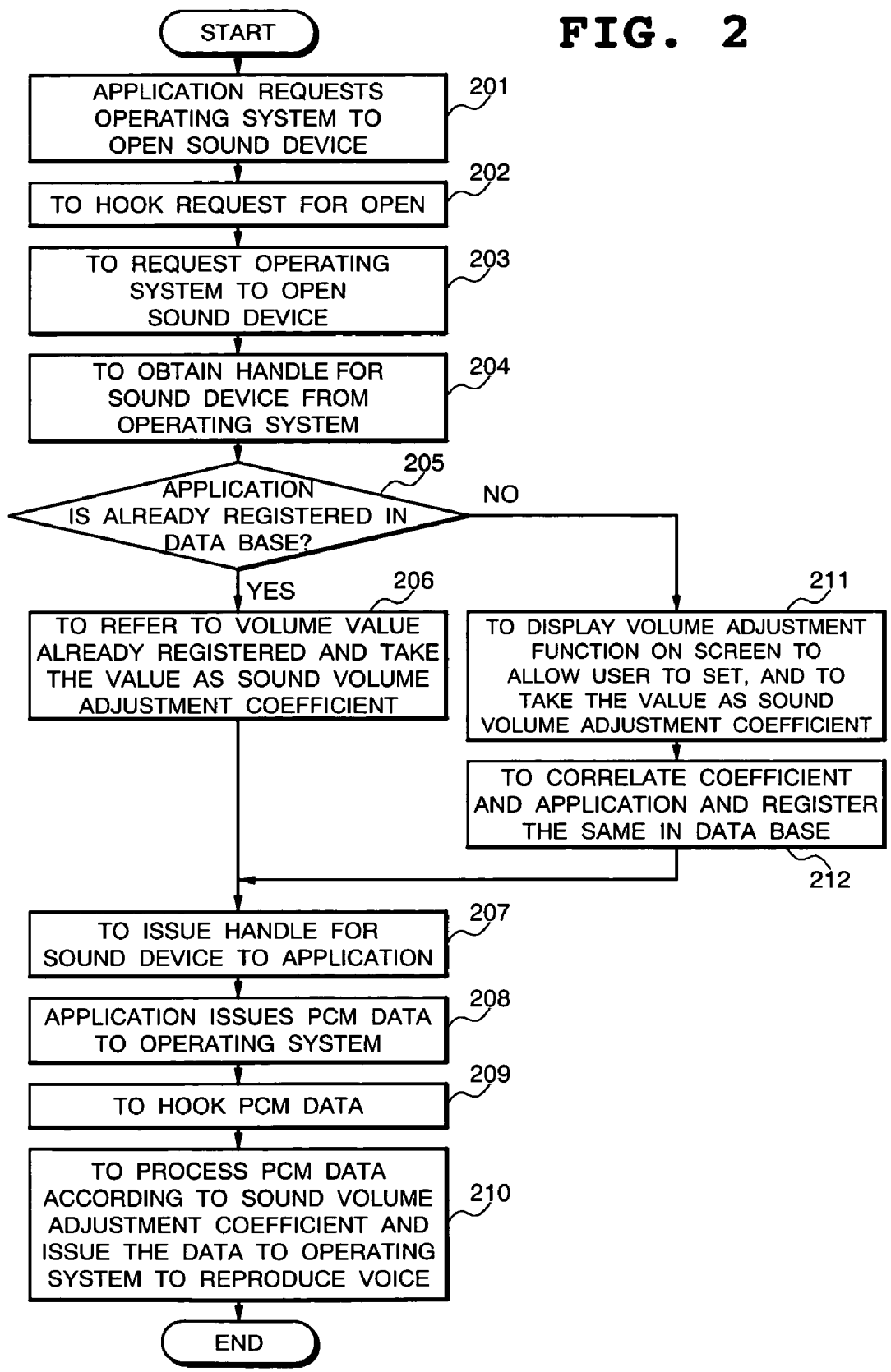
FIG. 2 is a flow chart for use in explaining a personal computer sound volume adjustment method according to the present embodiment of the present invention.
Figure 3:
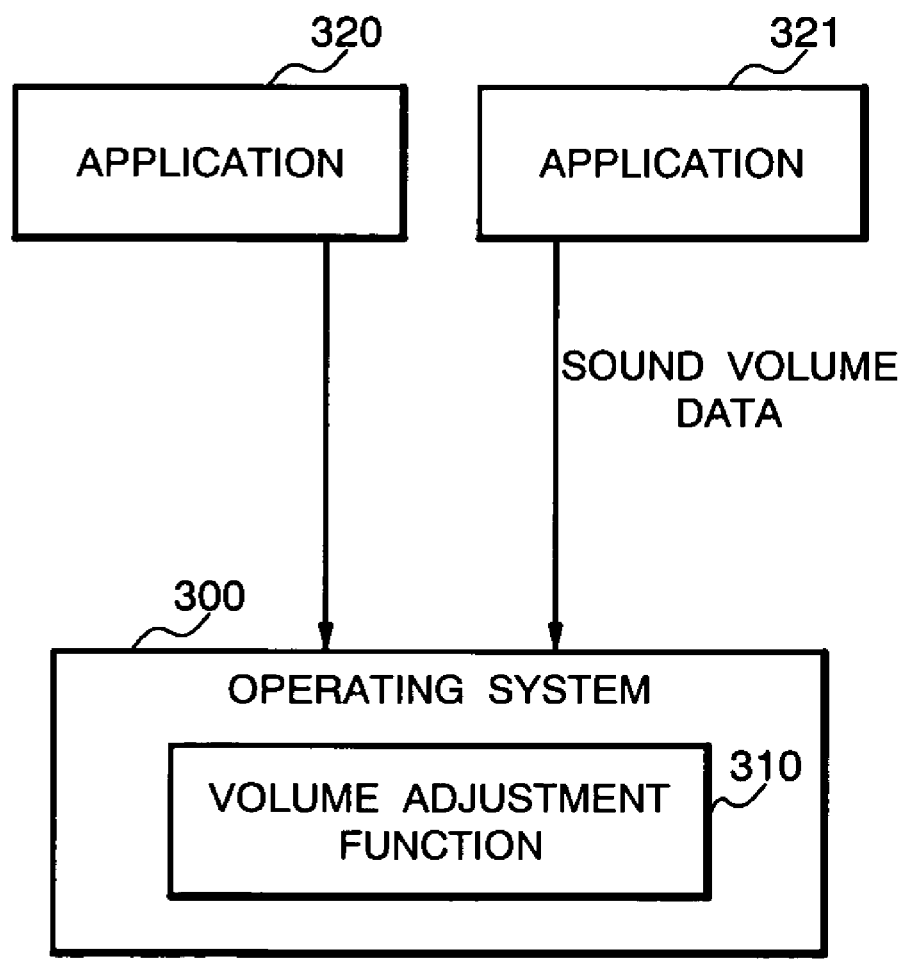
FIG. 3 is a functional block diagram for use in explaining a structure of a conventional personal computer.

FIG. 2 is a flow chart for use in explaining a sound volume adjustment method of the present embodiment.

At the reproduction of voice data from an application at the personal computer, the application 120 or 121 requests the operating system 100 to open a sound device of the personal computer (Step 201).

In the present embodiment, the sound volume adjustment control unit 130 provided between the applications 120 and 121 and the operating system 100 hooks the request for open (Step 202). Then, the sound volume adjustment control unit 130 requests the operating system 100 to open the sound device (Step 203).

Subsequently, the sound volume adjustment control unit 130 obtains a handle for the sound device from the operating system 100 (Step 204). Furthermore, the sound volume adjustment control unit 130 refers to the memory 140 to determine whether the application which has made a request for open is already registered or not (Step 205).

Then, if the application is already registered, the unit 130 obtains sound volume setting information corresponding to the application. Here, the unit obtains a sound volume adjustment coefficient (volume value) as the sound volume setting information (Step 206).

Next, the sound volume adjustment control unit 130 issues the handle for the sound device to the application (Step 207).

Then, the application issues PCM data as voice data to the operating system 100 (Step 208).

In the present embodiment, the sound adjustment control unit 130 hooks the PCM data (Step 209). Then, the sound volume adjustment control unit 130 adjusts the sound volume data of the PCM data. At the adjustment, the unit 130 multiplies the sound volume-data by the sound volume adjustment coefficient obtained at Step 206 to generate sound volume data having been adjusted.

Subsequently, the sound volume adjustment control unit 130 issues the sound volume data having been adjusted to the operating system 100. As a result, the voice data is reproduced based on the sound volume data having been adjusted (Step 210).

On the other hand, when determination is made at the above Step 205 that the application is yet to be registered, the sound volume adjustment control unit 130 displays the sound volume adjustment function indication on the operation screen 150. Then, through the user's operation of the sound volume adjustment function indication, the sound volume setting information corresponding to a new application, that is, a sound volume adjustment coefficient, is set (Step 211).

Then, the new application and the new sound volume adjustment coefficient correlated to each other are registered in the memory 140 (Step 212).

These procedures enable automatic sound volume adjustment based on the registered sound volume setting information when voice data is transferred from the application again.

Although in the present embodiment described above, description has been made of an example where the present invention is structured under specific conditions, various modifications are possible. For example, in the above embodiment, although the present invention has been described with respect to a case where voice data is transferred from the two applications 120 and 121, the number of applications in the present invention is not limited thereto.

As described in detail in the foregoing, the present invention enables automatic adjustment of sound volume data based on sound volume setting information registered including an application and a sound volume adjustment coefficient correlated to each other. As a result, simple sound volume adjustment operation realizes reproduction of voice data in a level sound volume appropriate for each application.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A sound volume adjustment system for a personal computer, said personal computer having a sound device, the system comprising:

a memory resident on the personal computer in which a plurality of sound volume adjustment coefficients are stored, each of the plurality of sound volume adjustment coefficients corresponding to a respective one of a plurality of software applications;

an operating system resident on the personal computer; and sound volume adjustment control means resident on the personal computer for adjusting, based on said plurality of sound volume adjustment coefficients, sound volume data for each application of the plurality of software applications, and for transferring the adjusted sound volume data to the operating system, wherein said sound volume adjustment control means adjusts said sound volume data for each application of the plurality of software applications by multiplying said sound volume data for each application by a corresponding one of said plurality of sound volume adjustment coefficients; and wherein each of the plurality of sound volume adjustment coefficients are set as multiples of a variable level of a sound volume of a system sound generated by said operating system, said variable level of said sound volume of said system sound being unchanged when an application of the plurality of software applications requests the operating system to open the sound device.

2. The sound volume adjustment system for a personal computer according to claim 1, wherein when data is transferred from a software application for which a corresponding sound volume adjustment coefficient is yet to be stored, said sound volume adjustment control means displays sound volume adjustment function indications on an operation screen to store, in said memory, the corresponding sound volume adjustment coefficient based on a sound volume set through said sound volume adjustment function indications corresponding to the software application.

3. The sound volume adjustment system of claim 1, wherein a sound volume level of said adjusted sound volume data is set to a level near that of the level of the sound volume of the system sound generated by said operating system.

4. A sound volume adjustment method for a personal computer, said personal computer having a sound device, the method comprising the steps of:

storing an operating system on the personal computer;

storing a plurality of sound volume adjustment coefficients that are set as multiples of a variable level of a sound volume of a system sound generated by said operating system, each of the plurality of sound volume adjustment coefficients corresponding to a respective one of a plurality of software applications;

adjusting sound volume data for each of the plurality of software applications by multiplying said sound volume data for each application of the plurality of software applications by a corresponding one of said plurality of sound volume adjustment coefficients; and transferring adjusted sound volume data to the operating system;

wherein said variable level of said sound volume of said system sound is unchanged when an application of the plurality of software applications requests the operating system to open the sound device.

5. The sound volume adjustment method for a personal computer according to claim 4, further comprising:

when data is transferred from a software application for which a corresponding sound volume adjustment coefficient is yet to be stored, storing a sound volume adjustment coefficient based on a set sound volume in said memory corresponding to the software application.

6. The sound volume adjustment method of claim 4, wherein the step of adjusting, comprises:

adjusting sound volume data for each of the plurality of software applications, such that a sound volume level of the adjusted sound volume data is set to a level near that of the level of the sound volume of the system sound generated by said operating system, by multiplying said sound volume data for each application of the plurality of software applications by a corresponding sound volume adjustment coefficient of the plurality of sound volume adjustment coefficients.

7. A computer readable memory storing a sound volume adjustment program for controlling a personal computer to conduct sound volume adjustment, said personal computer having a sound device, said sound volume adjustment program operating to perform the following steps:

interfacing with an operating system on the personal computer;

storing a plurality of sound volume adjustment coefficients that are set as multiples of a variable level of a sound volume of a system sound generated by said operating system, each of the plurality of sound volume adjustment coefficients corresponding to a perspective one of a plurality of software applications;

adjusting sound volume data for each of the plurality of software applications by multiplying said sound volume data for each application of the plurality of software applications by a corresponding one of said plurality of sound volume adjustment coefficients; and transferring adjusted sound volume data to the operating system;

wherein said variable level of said sound volume of said system sound is unchanged when an application of the plurality of software applications requests the operating system to open the sound device.

8. The computer readable memory storing a sound volume adjustment program for controlling a personal computer to conduct sound volume adjustment according to claim 7, wherein the following additional steps are performed:

when data is transferred from a software application for which a corresponding sound volume adjustment coefficient is yet to be stored, storing a sound volume adjustment coefficient based on a set sound volume in said memory corresponding to the software application.

9. The computer readable memory storing a sound volume adjustment program of claim 7, wherein the step of adjusting, comprises:

adjusting sound volume data for each of the plurality of software applications, such that a sound volume level of the adjusted sound volume data is set to a level near that of the level of the sound volume of the system sound generated by said operating system, by multiplying said sound volume data for each application of the plurality of software applications by a corresponding sound volume adjustment coefficient of the plurality of sound volume adjustment coefficients.

* * * * *